United States Patent Office 3,066,447
Patented Dec. 4, 1962

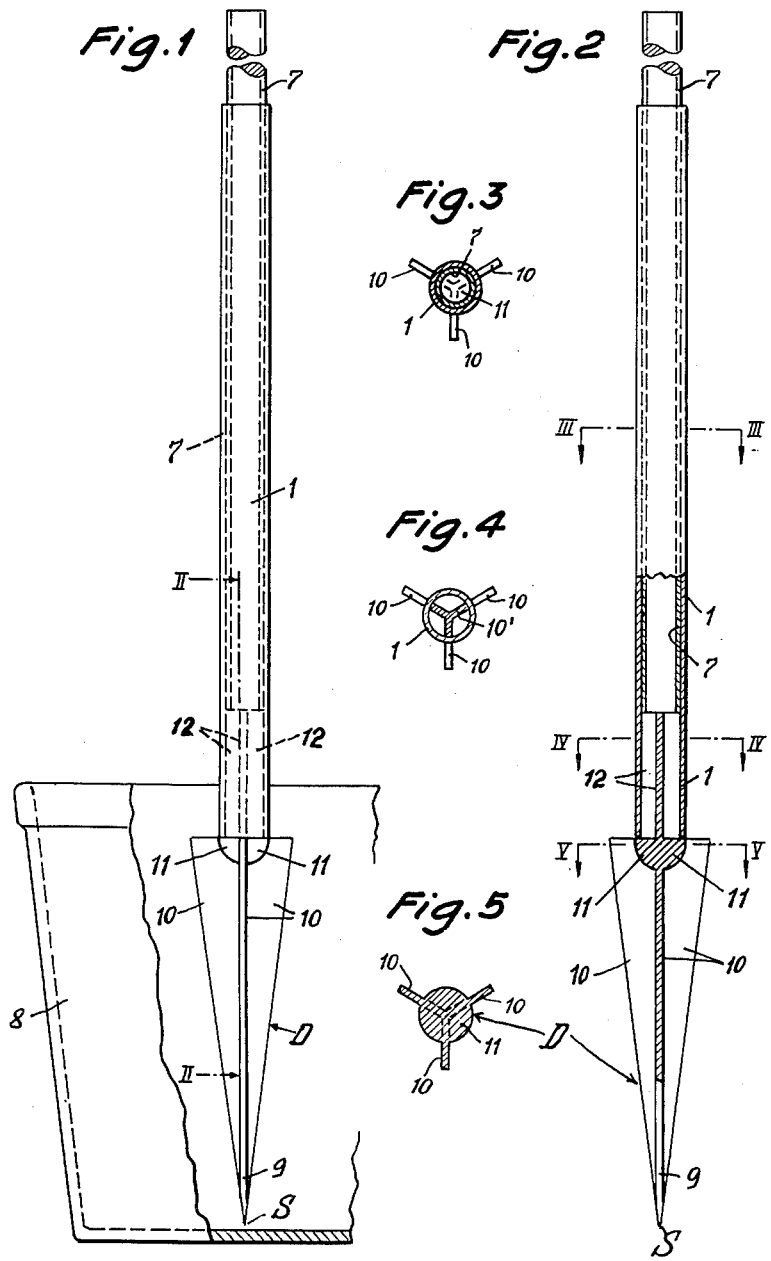

3,066,447
POTTED PLANT HOLDER
Fritz Reiterer, Inselstrasse 50, and Theodor Stücklin, Lothringerstrasse 125, both of Basel, Switzerland
Filed Apr. 19, 1961, Ser. No. 104,066
2 Claims. (Cl. 47—47)

Potted plants are bound to a stick as soon as they reach a certain height. To such end were used as a rule common wooden sticks pointed at their lower end and stuck into the earth. These wooden sticks rot relatively quickly and on account of their insufficient areas of anchorage or restraint in the earth do not find any secure hold as they have to be kept slender for aesthetic reasons. Sticks made of plastic also were unsuited owing to the unsatisfactory anchorage.

The subject matter of our present invention is a potted plant holder which is suited not only for use in small and large pots but which may be made and used in only one size for all pot sizes.

One form of the invention is shown, by way of example, in the drawing, in which:

FIG. 1 is a view of the holder inserted in a flower pot,

FIG. 2 is a view of the holder with partial longitudinal section on the line II—II of FIG. 1, and FIGS. 3 to 5 show cross sections on the lines III—III, IV—IV and V—V respectively.

The potted plant holder shown comprises a hollow shaft 1 of which the lower end portion is provided with an anchor means formed by a spine or spike D comprising a plurality of radial fins 10 which intersect each other in the shaft axis and taper to a common tip 9. The fins 10 are angularly spaced 120° from each other in the example shown. The upper end of spike D comprises a boss 11 from which stems a plug 12 that is formed by tangs 10' constituting extensions of the fins 10. Boss 11 affords the lower closure for hollow shaft 1 that is stuck on plug 12. A stick 7, available in various lengths, stuck into hollow shaft 1 serves as plant holder proper to which are secured the plants to be held. It is also imaginable to connect stick 7 directly to boss 11 so as to be integral with spike D.

Stick 7 may be made of any suitable material such as wood, bamboo, glass or plastic. When using sticks of wood or bamboo, their life is practically unlimited as they no longer come into contact with the wet or moist pot earth and thus cannot rot any more. Spike D and shaft 1 may consist of a non-corrosive material such as light metal, plastic and the like and be made in one operation by pressing, casting or die casting.

The radially extending fins 10 constitute areas of restraint acting against the earth to increase the stability of the spike in the earth. The spike occupies only little place in the pot and is stuck into the latter instead of a mere stick used so far. Propagation of the plant roots thus is not inhibited thereby.

The exchangeable stick 7 that may be used in various lengths, finds in hollow shaft 1 a sufficiently long guide so that also sticks of smaller diameter than the clear width of the shaft may be employed. This stick may be lengthened in adaptation to the growth of the plant, by plugging or securing thereto additional sticks.

Hollow shaft 1 furthermore may be provided with a bushing or sleeve that permits the accommodation of a holding stick 7 of different cross-sectional size.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described our invention, we claim as new and desire to secure by Letters Patent:

1. A potted plant holder comprising in combination a stick to which the plant is to be tied, and a spike-like anchor body sunk into the earth, said anchor body having laterally set-off vertical fins acting against the earth and being downwardly tapered to facilitate sticking same into the earth, said vertical fins intersecting in the axis of said spike-like anchor body and being radially disposed and tapering downwardly to a common tip, said vertical fins at their upper end merging into a boss of the spike axis, said boss serving as closure of a shaft and carrying a plug that is formed by upward extensions of said fins.

2. A potted plant holder comprising in combination a stick to which the plant is to be tied, and a spike-like anchor body sunk into the earth, said anchor body having laterally set-off vertical fins acting against the earth and being downwardly tapered to facilitate sticking same into the earth, said vertical fins intersecting in the axis of said spike-like anchor body and being radially disposed and tapering downwardly to a common tip, said vertical fins at their upper end merging into a boss of the spike axis, said boss serving as closure of a shaft and carrying a plug that is formed by upward extensions of said fins, said shaft being hollow and serving for receiving differently dimensioned holding sticks.

References Cited in the file of this patent

UNITED STATES PATENTS

| | | |
|---|---|---|
| 195,229 | Perkins | Sept. 18, 1877 |
| 200,206 | Langham | Feb. 12, 1878 |
| 210,648 | Turner | Dec. 10, 1878 |
| 249,803 | Sparks | Nov. 22, 1881 |
| 291,569 | Börner | Jan. 8, 1884 |
| 497,872 | Goodwin | May 23, 1893 |
| 503,804 | Poindexter | Aug. 22, 1893 |
| 1,632,965 | Hays | June 21, 1927 |
| 2,349,110 | Potstada | May 16, 1944 |

FOREIGN PATENTS

| | | |
|---|---|---|
| 800,614 | Germany | Nov. 23, 1950 |
| 215,347 | Switzerland | Sept. 1, 1941 |